UNITED STATES PATENT OFFICE.

AUGUSTUS T. SCHMIDT, OF PITTSBURG, PENNSYLVANIA.

IMPROVEMENT IN REFINING OILS.

Specification forming part of Letters Patent No. 164,694, dated June 22, 1875; application filed January 4, 1875.

*To all whom it may concern:*

Be it known that I, AUGUSTUS T. SCHMIDT, of Pittsburg, in the county of Allegheny and State of Pennsylvania, have invented a new and useful Improvement in Process of Treating Hydrocarbon Oils; and I do hereby declare the following to be a full, clear, and exact description thereof:

My invention relates to the method of treating hydrocarbon oils, more especially petroleum and its products, in the production of merchantable, illuminating, and other grades of oil; and it consists, first, in conducting the distillation in the presence of a sulphite or hyposulphite of any metal that will not discolor the oil; secondly, in subjecting the distillate to a washing in water holding a sulphite, hyposulphite, or hypophosphite in solution; the several steps being followed with the same article, or separately employed upon oils previously distilled by other methods.

Heretofore, in the manufacture of illuminating and other oils from petroleum, the mode generally followed is to take a distillate of proper gravity and fire-test, obtained by any of the well-known modes of distillation, and add thereto from four to six carboys of commercial sulphuric acid, the oil being agitated, and the acid added at once in bulk, or from time to time in divided quantities, according to the judgment of the operator, after which, the oil so treated is washed with water, and any acid present is neutralized by the addition of alkali. This is a crude process, the amount of acid used being a great waste, as well as injurious to the oil, to obviate both of which objections is the object of my present invention.

I proceed as follows: To the oil in the still I add a sulphite or hyposulphite of any metal which will not discolor the oil, preferring to use the hyposulphite of soda, though hyposulphite of zinc and other hyposulphites may be employed. In general, there will be sufficient water present in the still to dissolve the chemical, but if there is not, then sufficient water may be added to the hyposulphite to reduce it to a fluid condition before it is introduced. The distillation is then conducted in the usual manner, and the distillate obtained is removed to the agitator, where it is first treated with ordinary commercial sulphuric acid in about the proportions of one and one-half (1½) carboys of acid to every one hundred barrels of oil, to partially deodorize the oil, and to set free carbon and coloring matters, which are allowed to settle, and the sediment removed. As soon as the matters set free by the first portion of acid have settled, I proceed to treat the oil with dilute acid, using about one-half carboy of acid to the hundred barrels of oil, and diluting the acid by the addition of water in about the proportions of one part water to two parts acid, by measure, the mixture being allowed to cool before it is used, and the oil being agitated at the time the mixture is introduced; the object of this treatment being to throw down all the coloring and foreign matter which is still held in suspension, though set free by the first acid treatment. The solution of acid and water is improved by the addition of a sulphite of any metal of the class above specified, but such addition is not necessary to the operation of the solution. After the distillate has been treated as above, I wash it in a bath having a hyposulphite or hypophosphite in solution, preferably the hyposulphite of soda, in about the proportions of one pound of the hyposulphite to forty gallons of water. The object of this washing is to dissolve and carry off any coloring matter that may yet remain, and also a portion of the free acid, enough of the acid remaining to unite with the hyposulphite and liberate sulphurous acid, which will bleach and deodorize the oil. The oil is then subjected to a final washing with clear water, and neutralized with an alkali as usual. The proportions given for the acid and water, and salt and water solutions, are those which I have found to be serviceable, but it is not my intention herein to confine myself to them, as the proportions can of course be varied, as found desirable and demanded by the qualities of the oil operated upon. The invention therefore consists, first, in distilling petroleum and similar hydrocarbons in the presence of a sulphite or hyposulphite that will not discolor the oil, whereby the necessity of redistilling the last products is avoided, and an increased yield (at least ten per cent.) is obtained; secondly, in treating the distillate with solutions containing hyposulphites or hypophosphites, to dissolve and carry away any remaining coloring or foreign matter, and to liberate an "ous" acid in the body of the oil, for the purpose of bleaching the oil and to aid in deodorizing it.

Having thus set forth my invention, what I claim and desire to secure by Letters Patent, is—

1. In refining oils, the process of subjecting the oils to distillation in the presence of a sulphite or hyposulphite, substantially as and for the purpose specified.

2. In treating oils, the process of washing the distillate in a bath of water holding a hyposulphite or hypophosphite in solution, substantially as and for the purpose specified.

In testimony whereof, I, the said AUGUSTUS T. SCHMIDT, have hereunto set my hand.

AUGUSTUS T. SCHMIDT.

Witnesses:
    T. W. RITTER, JR.,
    T. B. KERR.